United States Patent [19]
Mullins

[11] 3,837,602
[45] Sept. 24, 1974

[54] MOUNTINGS FOR POWER PLANTS

[75] Inventor: John Albert Mullins, Chellaston, England

[73] Assignee: Rolls-Royce (1971) Limited, London, England

[22] Filed: Feb. 26, 1973

[21] Appl. No.: 336,044

[30] Foreign Application Priority Data
 Mar. 4, 1972  Great Britain.................... 10242/72

[52] U.S. Cl. ................................................. 244/54
[51] Int. Cl. ............................................ B64d 27/00
[58] Field of Search....... 244/54, 53 R, 53 B; 248/5; 60/39.31

[56]  References Cited
 UNITED STATES PATENTS

| | | | |
|---|---|---|---|
| 2,936,978 | 5/1960 | Lauck | 60/39.31 |
| 3,307,807 | 3/1967 | Stoppe | 244/54 |
| 3,318,554 | 5/1967 | Ward et al. | 244/54 |
| 3,362,659 | 1/1968 | Razak | 244/54 |
| 3,448,945 | 6/1969 | Ascani | 244/54 |
| 3,540,682 | 11/1970 | Dibble | 60/39.31 |
| 3,727,862 | 4/1973 | Kaufhold et al. | 244/54 |
| 3,750,983 | 8/1973 | Morris | 244/54 |

Primary Examiner—Trygve M. Blix
Assistant Examiner—Charles E. Frankfort
Attorney, Agent, or Firm—Cushman, Darby & Cushman

[57]  ABSTRACT

An aircraft is provided with overwing mounted ducted fan gas turbine engines, the engines being mounted within nacelles formed on the upper surface of the wing main spar. The nacelles provide a part of the engines fan flow ducts and also provide attachment points to which the engines are attached in a manner which transmits thrust loads directly to the wing main spar.

9 Claims, 4 Drawing Figures

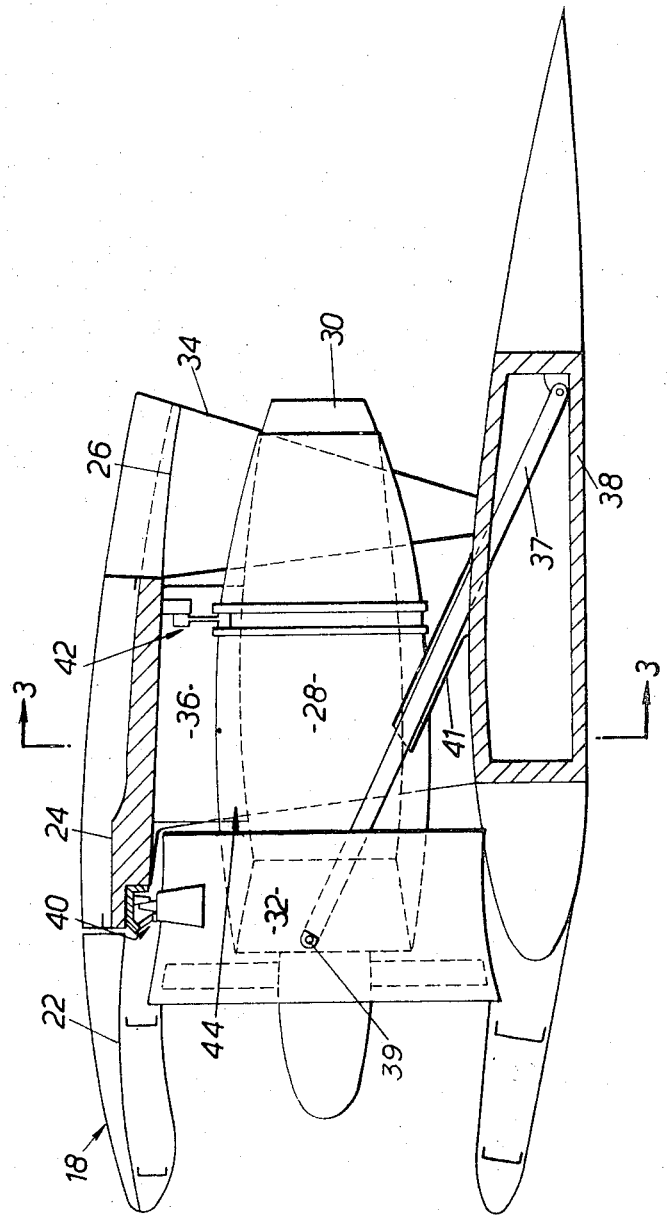

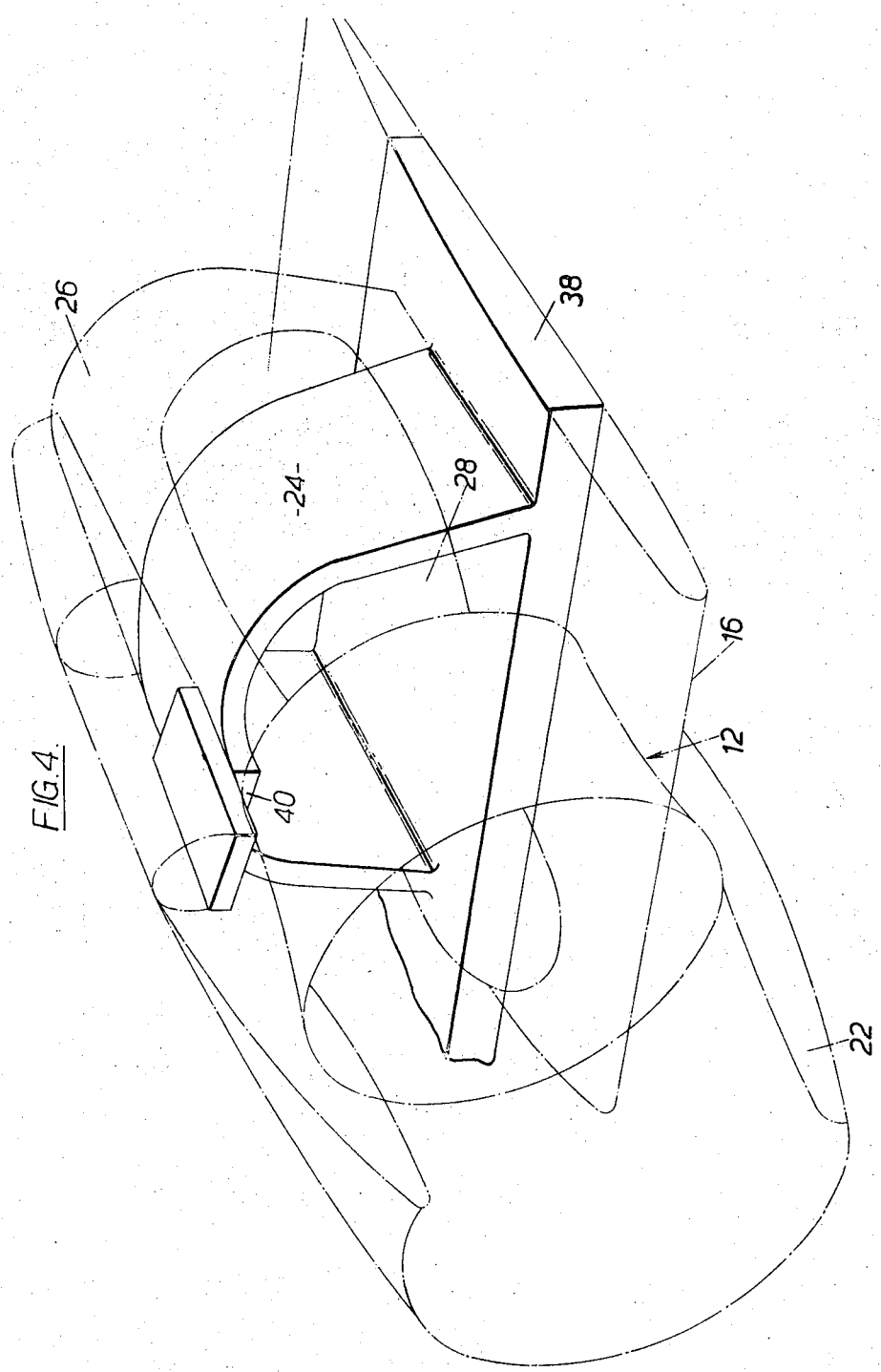

MOUNTINGS FOR POWER PLANTS

This invention concerns mountings for power plants, particularly but not restrictively for use on aircraft.

According to the present invention there is provided an aircraft wing main spar having a nacelle attached to one side thereof, the wall of which nacelle is adapted for the receipt of one end of at least one ducted fan gas turbine engine attachment means, by means of which, in operation, a ducted fan gas turbine engine is attached to said nacelle.

Preferably the inner surface of the nacelle wall forms at least a part of a fluid flow duct of the ducted fan gas turbine engine.

Preferably the nacelle forms at least a part of the fan duct of the ducted fan gas turbine engine.

Preferably the nacelle is attached to that side of the main spar which, on assembly of the spar to an aircraft, is uppermost.

The invention will now be described by way of example only and with reference to the accompanying drawings in which:

FIG. 2 is a view on line 2—2 of FIG. 1,

FIG. 4 is a pictorial view of a boom or spar in accordance with the invention.

Figure 1:
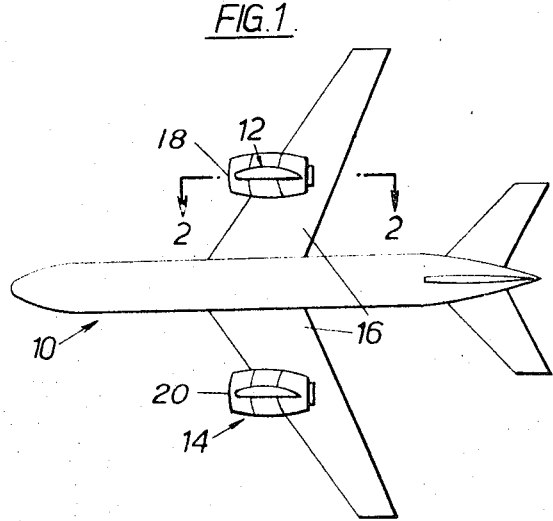
FIG. 1 is a diagrammatic view of an aircraft.

In FIG. 1 an aircraft 10 is propelled through the air by two ducted fan gas turbine engines 12-14 mounted over the wing 16 and enclosed in nacelles 18-20 respectively.

As shown in FIG. 2 each of nacelles 18–20 comprise an air intake structure 22, a main portion 24 and an outlet nozzle structure 26 and this assembly surrounds the respective ducted fan gas turbine engines 12-14. FIG. 2 shows only engine 12 but it is to be understood that engine 14 is similarly embedded.

As is known in the art, the hot gases generated by the gas generator core engine 28 of the ducted fan gas turbine engine 12 passes out of a nozzle 30 and the ambient air sucked in by the ducted fan portion or cowl 32 passes from the fan stage into a fan duct and out of a separate nozzle 34.

In the present invention the fan duct 36 downstream of the fan stage comprises the nacelle 24 which is constructed either integrally with the torque box main wing spar 38 of the wing 16 of the aircraft, or is made separately therefrom but rigidly fixed thereto for operation so as to be, to all intents and purposes, integral with the torque box main wing spar.

That portion of the nacelle inner wall surface most remote from the torque box main wing spar 16, is shaped to receive and retain the suspension linkage 40-42 of the ducted fan gas turbine engine 12 such that on assembly of the engine in the nacelle, the engine and nacelle longitudinal axes coincide. After attachment of the engine therein, intake portion 22 and outlet portion 26 of nacelle 18 are added to complete the necessary ducting and streamlining of the assembly. A hollow strut 44 is positioned radially across the duct 36 so that fuel lines and/or auxiliary drives (not shown) may be threaded therethrough and connected to appropriate aircraft structure externally of the engine 12 and a thrust strut 37 has one end 39 connected to gas generator core engine 28 and the other end connected to torque box main wing spar 38 so that the torque box main wing spar directly absorbs the thrust loads exerted by the engine as a whole. Where the thrust strut 37 has to pass through flow ducts, it is covered by streamlined hollow struts 41 to maintain flow disturbance at a minimum.

Figure 3:
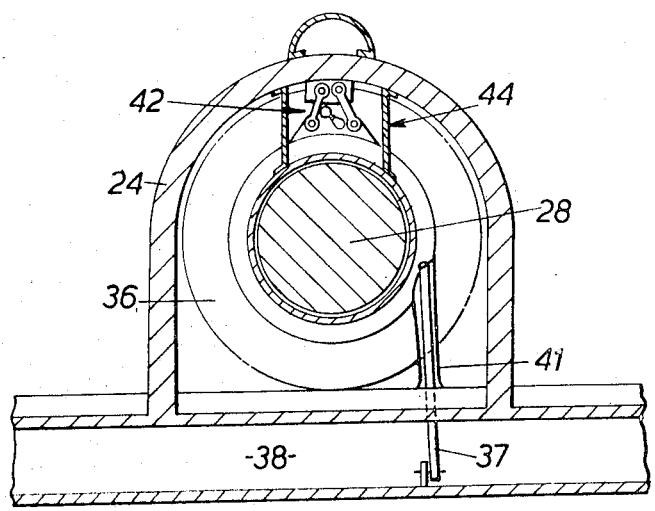
FIG. 3 is a view on line 3—3 of FIG. 2.

Reference to FIG. 3 shows that the hot gas outlet 30 is circular whereas the fan duct air outlet 34 is in the form of an inverted 'U.' The duct shapes need not be restricted to these particular configurations, but the cross-sectional shape of duct 36 could, by suitable design, be changed from 'U' to circular within its length. Alternatively the nacelle main portion 24 could be formed with a circular cross-section throughout its length, with the possible drawback of having as a result, only one junction point with torque box main wing spar 38, instead of the two shown in FIGS. 3 and 4.

It has been found that in providing an overwing mounted engine, several advantages result, of which two, namely greater ground clearance when an aircraft is landing or taking off and some engine noise deflection upwards by the wing upper surface, are readily appreciated. However, a third advantage is derived directly from the type of nacelle described herein, and that is an engine can be designed which will fit both the underwing pylon engine supports as known in the art and the overwing engine support described herein, simply by making the inner surface of the appropriate part of the nacelle identical with the pylon engine mounting surface and in turn supporting the nacelle rigidly on the torque box main wing spar 38 and then mounting the engine in the nacelle and connecting it via the thrust strut, to the torque box main wing spar so that all engine operating stresses are transmitted directly to the torque box main wing spar and thence to aircraft structure. It will be appreciated by those skilled in the art that the present invention greatly simplifies the supplying of a standard engine for fitting into more than one aircraft, each of which has engine location points which differ considerably one aircraft from the other. This in turn will reduce cost and difficulties of maintenance in the field.

I claim:

1. In combination with a wing structure having a main spar, an arrangement for mounting above said wing structure at least one ducted fan engine of the type comprising a gas generator core engine having a casing, a station of fan blades forward of said casing, and a cowl surrounding said station of fan blades and defining a portion of a fan duct surrounding said casing, said arrangement comprising:

a nacelle extending about said at least one ducted fan engine and spaced from the casing of said gas generator core engine to define a remaining portion of said fan duct;

means for supporting said nacelle from an upper surface of said main wing spar; and a first attachment means to fixedly support said ducted fan engine from said nacelle at a position on said nacelle remote from said nacelle's support from said wing spar whereby weight load and at least some thrust loads of said at least one ducted fan engine are transmitted directly through said first attachment means and through said nacelle to said main wing spar.

2. The combination as claimed in claim 1 in which said first attachment means includes at least a pair of longitudinally spaced attachment members, a first of said attachment members attaching said cowl to said nacelle and a second of said attachment members attaching said gas generator core engine to said nacelle at a position downstream of said first attachment member and downstream of said gas generator core engine's mid-point.

3. The combination as claimed in claim 2 including a second attachment means comprising a thrust strut connected at one end to the upstream end of said gas generator core engine and at its other end to a lower portion of said main wing spar.

4. The combination as claimed in claim 1 including a second attachment means connecting a forward portion of said gas generator core engine to said main spar at a location remote from the upper surface of the main spar for absorbing other thrust loads of said at least one ducted fan engine whereby the main spar absorbs all weight and thrust loads.

5. The combination as claimed in claim 4 in which said second attachment means includes a thrust strut extending in a generally longitudinally direction and connected at one end to the upstream end of said gas generator core engine, said strut extending through said main wing spar and connected at its other end to a lower portion of said main wing spar.

6. The combination as claimed in claim 1 in which said nacelle includes a main portion which is structurally supported from said main spar, a detachable intake portion connected to the upstream end of said main portion and surrounding and projecting forward of said cowl, and an outlet portion detachably connected to the downstream end of said main portion and surrounding the downstream end of said gas generator core engine, said outlet portion defining a fan nozzle.

7. The combination as claimed in claim 6 in which said nacelle has an inverted U-shaped cross-section at least in its main portion.

8. The combination as claimed in claim 6 in which said main portion of said nacelle is integral with said main wing spar.

9. The combination as claimed in claim 6 in which said main portion of said nacelle is separate from, but rigidly fixed, to said main wing spar.

* * * * *